UNITED STATES PATENT OFFICE.

WILLIAM H. CHASE, OF PENSACOLA, FLORIDA.

IMPROVEMENT IN MASTIC CEMENTS.

Specification forming part of Letters Patent No. 3,999, dated April 16, 1845.

*To all whom it may concern:*

Be it known that I, WILLIAM H. CHASE, major in the United States Corps of Engineers, have invented a new and Improved Mastic, to which I have given the name of "Argillous Mastic;" and I do hereby declare that the following is a full and exact description.

The nature of my invention consists in the use of clay and red sandstone or of red sandstone alone in combination with the mineral tar of Sessyl or any other tar or bitumen which has or may be used in other mastics, my invention being simply the substitution of materials hereinbefore used in the composition of mastics for those at present in use, such as the stone of Sessyl or Valdee Travers and other assimilated materials. The materials, as stated before, are a clay pure (angil) and a red sandstone, in which, besides silex, an oxide of iron and some argillaceous earth are exhibited, so that also the nature of my mastic consists in the use of these several materials, whether separately or as found in combination. These, being boiled and mixed with the mineral tar of Sessyl or with other tars or bitumens commonly used in the formation of mastics, make a mastic which upon careful experiment has proved equal, if not superior, to any known mastic, and at the same time possessing the advantages of the use of less costly materials than those generally used, especially that of the stone of Sessyl or Valdee Travers. This mastic possesses another advantage in being composed of three materials, or, rather, of four materials, the oxide of iron being considered as one, silex, argil, and mineral tar. The advantage consists in this, that the clay contracts under heat, while the silex and oxide of iron expand, and under cold the reverse takes place, so that the contraction of the clay is compensated by the expansion of the sandstone and the expansion of clay compensated by the contraction of the sandstone, by which, when the mastic is exposed to either heat or cold, no cracks are exhibited.

To enable others to make and use my invention, I will proceed to describe its preparation and application.

The clay and red sandstone are pulverized in a large mortar, or, in extended operations, in a mortar-mill. In this state they are passed through a fine sieve, the several materials being kept perfectly dry and separate. As the absence of all moisture is essential, it is better that the powdered materials should be passed through a hot oven previously to being mixed with the tar. A proportion of the tar or bitumen is placed in a kettle over a brisk fire. When the tar is melted the powdered clay and sandstone are very gradually and alternately poured into the kettle, the assistant stirring the moisture very briskly. Care must be had in not pouring in at one time too large a quantity of the clay or sandstone for fear of suddenly lowering the temperature of the tar, by which difficulty occurs in performing the remainder of the operation of mixing. By pouring in gradually the clay and sandstone soon receive the temperature of the boiling tar. The constant boiling of the tar must be kept up in order to insure a good operation. After the materials are thoroughly mixed, ten or fifteen minutes will suffice with a quick fire to complete the boiling, care being had to keep the mass in constant motion by stirring briskly.

The mastic, being thus made, is applied by being taken up in ladles and poured on the surface which it is intended to cover, and which in its fusible state its given thickness is arranged into the trowel, which is found to be the most handy of the applier's tools. Several trowels should be at hand, kept perfectly clean to insure a neat and speedy manipulation. The mastic cools very rapidly, even when exposed to the sun's heat. Small iron bars or rules are used to preserve regularity in the courses in making the joints.

A great variety of proportions of the materials suitable to different exposures and uses may be had of this mastic, it being applied to all surfaces, either plane, inclined, or vertical; to all exposures, whether of rain, the sun's heat, or the cold of winter; to terraces, walks, streets, roofs; to floors and walks of houses, magazines, and cellars; to walls of masonry covered by earth; to the roofs and gutters of casemates; to the bottoms of vessels, and to all wood-work of wharves, jetties, breakwaters, &c., to prevent the worm's bite, and, in short, to every purpose to which any known mastic can be applied. In applying it to surfaces exposed to the heat of the sun on inclined or vertical planes a very large proportion of the clay and red sandstone is used with the mineral tar. This is necessary to prevent motion from heat. The following proportion has resulted as necessary to hardness: fourteen hundred and fifty-two ounces of powdered clay, seventeen hundred and twenty-eight ounces of sandstone, and four hundred and fifty-six ounces of mineral tar; in all, three thousand six hundred and thirty six ounces; contents in cubic inches, four thousand nine hundred and thirty-two, the clay and sandstone not being packed, but measured by pouring in the materials lightly; the tar measured in its solid state. The specific gravity of this moisture before boiling was 1275 ounces. The specific gravity after cooking was 2265.6, with a reduction of bulk. A block of mastic six by six by two and one-half inches is a specimen of this mastic, and will be sent to the Commissioner of Patents, together with a duplicate of the composition, (marked 2.) A specimen (marked 3,) in which red sandstone is alone used with the mineral tar is also sent.

The only difference in other specimens consists in varying the proportion of the materials, or, as previously recited, using the red sandstone alone with the mineral tar or other bitumens.

What I claim for my invention, and desire to secure by Letters Patent, is—

The substitution of red sandstone and clay reduced to a powder in their natural state, or argil, silex, and the oxide of iron for the stone of Sessyl or Valdee Travers or other assimilated materials, in combination with the mineral tar of Sessyl or with any other bitumens used in the formation of mastics, or in the use of red sandstone alone with mineral tar or other bitumens.

WM. H. CHASE.

Witnesses:
JASPER STRONG,
J. M. SCOTT.